United States Patent [19]

Gorbatov et al.

[11] 4,364,309
[45] Dec. 21, 1982

[54] SAUSAGE PRODUCTION LINE

[76] Inventors: Vasily M. Gorbatov, prospekt Mira, 74, kv. 70; Evgeny T. Spirin, ulitsa Usacheva 29, korpus 3, kv. 203; Vladimir V. Shakhov, ulitsa Yablochkova 31, kv. 73; Viktor V. Vagin, 9 Sokolnicheskaya ulitsa, 1, korpus 2, kv. 78; Vyacheslav I. Khromov, Volgogradsky prospekt, 71 korpus 2, kv. 200; Zimel A. Bogushev, Universitetsky prospekt 6, kv. 125; Viktor I. Eremin, ulitsa Bratskaya, 27 korpus 3, kv. 75; Kaletta M. Vainzof, ulitsa Poteshnaya, 2, kv. 34; Evgeny R. Podkhvatilin, Stavropolskaya ulitsa, 7b, kv. 16, all of, Moscow, U.S.S.R.

[21] Appl. No.: 62,122

[22] Filed: Jul. 30, 1979

[51] Int. Cl.³ ............................................. A22C 7/00
[52] U.S. Cl. ...................................... 99/352; 99/353; 99/427; 99/441; 99/444; 198/472; 249/121; 249/126; 249/158; 425/116; 425/127; 425/129 R
[58] Field of Search ................. 99/352, 339, 352–353, 99/373, 427, 441, 444; 198/472; 249/82, 158, 121, 126, 120; 425/110, 127, 129

[56] References Cited

U.S. PATENT DOCUMENTS

| | | | |
|---|---|---|---|
| 994,714 | 6/1911 | Boyle | 99/441 X |
| 2,748,691 | 6/1956 | Johnson | 99/444 |
| 2,897,745 | 8/1959 | Nichols et al. | 99/441 X |
| 3,478,859 | 11/1969 | Krempel et al. | 198/472 |
| 3,502,018 | 3/1970 | Keszler et al. | 99/441 X |
| 3,712,208 | 1/1973 | Adolphi | 99/373 |
| 3,809,208 | 5/1974 | Shields | 198/472 X |
| 3,857,330 | 12/1974 | Ruckstaetter | 99/427 X |
| 3,923,037 | 12/1975 | Donato | 99/339 X |
| 4,081,564 | 3/1978 | Borsuk | 99/352 X |

Primary Examiner—Harvey C. Hornsby
Assistant Examiner—Joseph M. Pitko
Attorney, Agent, or Firm—Lilling & Greenspan

[57] ABSTRACT

The present invention relates to the meat-packing industry. The production line of the present invention comprises, mounted in a closed loop in the direction of production flow, a sausage meat feeder, filling and batching means, block molds, heat and cold treatment chambers, means for discharging the finished product and means for washing the block molds. In accordance with the present invention, the closed loop is formed by step-type conveyors arranged in two parallel rows located in a single plane, the pitch of each one of said conveyors being limited by the dimensions of one block mold, said conveyers serving to move the block molds from the sausage meat filling and batching means via the heat and cold treatment chambers, means for discharging the finished product and means for washing the emptied block molds to the filling and batching means.

14 Claims, 24 Drawing Figures

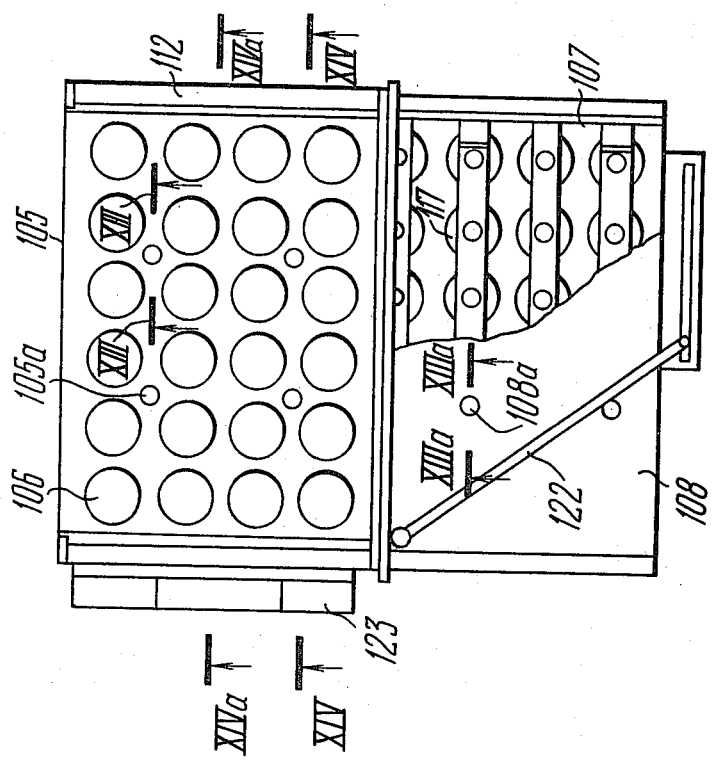
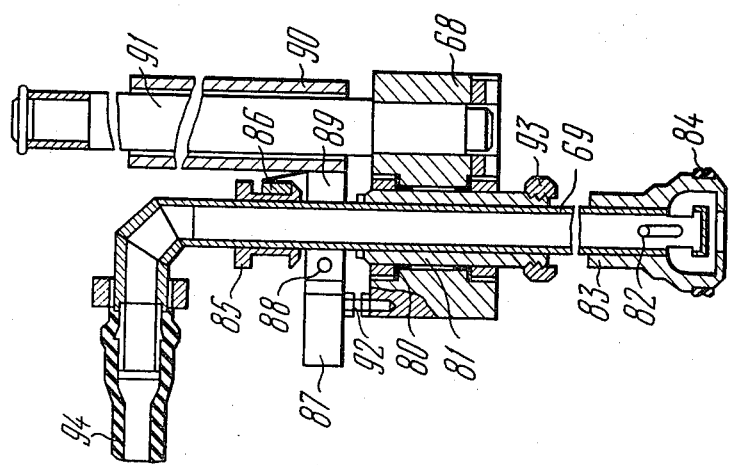
FIG. 10
FIG. 9

SAUSAGE PRODUCTION LINE

The present invention relates to the meat-packing industry and, more particularly, it relates to sausage production lines.

Known in the art are mechanized sausage (frankfurter) production lines which produce sausage in envelopes in a cyclic or continuous process.

As a rule, such lines consist of separate devices and involve mechanized and manual operations.

The prior art lines include standard equipment interlinked by conveying means. Some of the prior art lines provide for separate preparation of sausage meat and for separate heat and cold treatment of finished products. Other lines include sets of equipment designed to produce sausage products from ready-made sausage meat. The latter technical solution has for its analog a mechanized line for the production of envelope-free frankfurters.

However, the prior art mechanized line is incapable of producing finished frankfurter products in its principal working member (coagulator). It only provides for preliminary forming of the products to be followed by heat treatment.

The production of frankfurters in the prior art line is characterized by a double loss of the product, namely, the loss of 1-2 percent during coagulation and the loss of 15-17 percent during air treatment of the uncoated products. Other disadvantages of the latter line include the need for repeated transfer of frankfurters from unit to unit, which affects the integrity of the products. In addition, the process of producing sausage in the prior art line is rather slow.

The closest analog (or prototype) of the disclosed invention is provided by a sausage production line described in a booklet on "Technicheskii uroven proizvodstva v miasnoi promyshlennosti otdelnyh zarubezhnyh stran"—Technical Level of Production in the Meat-Packing Industry of Some Foreign Countries.

The line comprises a suspension track with suspended molds, manual means for greasing and filling the molds, manual means for closing and opening the mold lids, steam-air chambers for heat and cold treatment, means for discharging the product and means for washing the molds Said line operates in the following manner: the molds are supplied via suspension track to a filling unit consisting of a hose with a special nozzle designed to be introduced into each mold for filling it with product. The molds are then manually closed with lids and transferred to the heat treatment chamber into which a steam-air medium is injected. Then, the molds with product are cooled in an intense air flow. The balancing of temperature inside the product and further cooling of the latter is done in the cold treatment chamber wherein the required low temperature is maintained. After cooling, the molds with product are directed to a discharge station where the manual discharge means is used to push the product in the form of cylindrical loaves out of the molds. Then, the loaves are placed on a special tray to be washed. The molds are directed to a washing station to be flushed with hot water and scrubbed with mechanical brushes. If necessary, final washing is done manually. After the product is removed from the tray, the latter is likewise flushed with hot water. After that, the molds are used in repeated cycles.

The prior art line suffers from excessive duration of the sausage production process, which is due to a large number of auxiliary operations calling for substantial manual labor and time. Such operations include the following:

the molds are filled by means of a special nozzle which can only fill one mold at a time, thereby limiting the efficiency of the filling means, the filling being done manually;

setting the lids of the block mold, their closing prior to the admission of the block mold to the heat treatment chambers, as well as opening the lids prior to discharging the finished product, is done by manual means which requires time for their mounting and preparation for work, this affecting the efficiency of the line and hampering the automation of the operation;

the finished loaves are pushed one-by-one out of the block molds, which also affects the efficiency. Considerable time is required for placing each loaf on the tray and for removing the products from the tray, this also limits the efficiency of the production line;

the use of suspended block molds which move along the suspension track and are hard to stabilize in the course of a number of the aforementioned operations makes it impossible or very difficult to utilize mechanisms capable of performing the work automatically, without the intervention of an operator, whereby it appears impossible to increase the efficiency of the production line and develop a fully automated process.

It is the principal object of the present invention to develop a sausage production line characterized by a high sausage production efficiency.

It is another object of this invention to develop said sausage production line with a smaller number of auxiliary operations.

These and other objects of the invention are attained in a sausage production line comprising a sausage meat feeder, sausage meat filling and batching means, block molds, chambers for heat and cold treatment of the finished product, means for discharging the finished product and means for washing the block molds, all mounted in the direction of production flow in a closed loop formed by step-type conveyors arranged in two parallel rows located in a single plane, the pitch of each of said conveyors being limited by the dimensions of a single block mold, said conveyors serving to move the block molds from said means for filling and batching the sausage meat into the block molds via said chambers for heat and cold treatment of the finished product, said means for discharging the finished product and said means for washing the emptied block molds to said sausage meat filling and batching means.

It is expedient that the step-type conveyors be interconnected at the ends of their rows by means of roller trains ensuring the lifting and lowering of the block molds from one row of the conveyors to the other one in the direction of production flow, thereby reducing the production space owing to a shorter idle run of the block molds.

It is good practice that each of the roller trains consist of two frames located one above the other and interconnected by a lever for lifting and lowering the top frame by means of a hydraulic cylinder mounted on the bottom frame. Such an arrangement of the roller trains provides the most simple-to-manufacture and easy-to-service structure.

The sausage meat filling and batching means can be mounted on a frame and include horizontally extending guides located on the top base of said frame, said guides accommodating a plate which carries vertically extending spindles and a hydraulic cylinder whose rod is coupled kinematically with the spindles to ensure the lowering of the latter in the course of filling and batching the block mold, as well as a mechanism for row-by-row shifting of the spindles. Such a design helps reduce the time required for filling and batching the sausage meat into the block molds thanks to the use of a greater number of spindles, thereby increasing the efficiency of the filling and batching means and providing the possibility of its on-line utilization.

The mechanism for row-by-row shifting of the spindles can include horizontal bars mounted in bearings of the top base of the frame of the filling and batching means, one end of each of said bars being connected to a rod of a hydraulic cylinder mounted on the top base of the latter frame to provide for reciprocation of the bars which carry rests adapted to cooperate with pawls provided in the plate for row-by-row shifting of the spindles, thereby obviating the manual operation of row-by-row shifting of the spindles.

The mechanism for row-by-row shifting of the spindles can further include pins located in the plate in parallel with the bars for longitudinal movement, said pins having at their ends grooves designed to receive ends of springs whose other ends are rigidly coupled with the pawls, thereby eliminating the need for idle runs of the plate and providing the possibility of starting the process of filling the block mold from any extreme position of the plate.

The block mold includes a housing which accommodates vertical rows of molds whose upper lids are mounted for movement in horizontal and vertical planes while lower lids are mounted for movement in a horizontal plane, the block mold further including cleats attached to the housing and adapted to press the lower lids against the housing. Since the lids are capable of movement in different planes, it appears possible to obviate the need for manual labor in the course of opening and closing the block mold.

It is expedient that longitudinal and lateral partitions be provided inside the housing of the block mold between the molds, said partitions designed to define the direction of coolant flow in the course of thermal treatment, which is necessary in order to provide for a uniform effect of the environment upon the product.

The means for opening and closing the upper lids of the block molds can comprise a hydraulic cylinder to whose rod is attached a cross-piece carrying grips provided with chamfers adapted to cooperate with the upper lids upon the movement of the latter in a vertical plane in the course of being opened and closed. Such a design helps obviate the use of manual labor during the operations of opening and closing the upper lids of the block mold.

The means for opening the lower lid of the block mold can include at least two hydraulic cylinders arranged symmetrically on the sides of a step-type conveyor, the rods of said cylinders carrying levers mounted thereon for turning in a vertical plane and adapted to rest against the cleats and, upon the movement of the block mold over the step-type conveyor, lift the block mold housing, said means further including cams coupled kinematically with the step-type conveyors and cooperating with the lower lid in the course of the conveyor movement. This latter design helps obviate the use of manual labor during the operation of opening the lower lid.

It is expedient that the chambers for heat and cold treatment of the finished product be provided with coolant collectors shaped as inverted prisms, located on the sides of the chambers and communicating with the coolant outlet from the block mold. This makes for rapid collection of coolant irrespective of the block mold position in the chamber and for reduction of heat losses to the environment.

In order to transfer the finished product from the means for discharging same into means for surface heat treatment, there can be provided a reloading means, which helps eliminate manual discharge operations and increase the efficiency owing to simultaneous reloading of a large number of products.

The means for reloading the finished product can include a receiver fashioned as cylindrical sleeves whose shape correspond to that of the finished product and which are provided with bottoms with holes overlapped from below by a plate. The provision of the plate overlapping the bottom holes results in the creation, at the moment of discharging of an air cushion for each product protecting the latter from deformation.

The means for washing the block molds can include a chamber designed to accommodate a block mold to be washed and provided on the sides with manifolds with nozzles for washing the block mold housing and lids, which helps obviate the use of manual labor when washing the block mold and increase the line efficiency.

The means for closing the lower lid of the block mold can include grips arranged symmetrically on the sides of the step-type conveyor and loose-fitted on a single axle coupled with a rod of a hydraulic cylinder mounted on the step-type conveyor, and cams secured on the step-type conveyor, said cams having their center of gravity below their rotation axis and cooperating with the lower lid in the course of the conveyor movement.

BRIEF DESCRIPTION OF THE DRAWINGS

The present invention will be better understood upon considering the following detailed description of an examplary embodiment thereof, with due reference to the accompanying drawings in which:

FIG. 9 is a section taken along the line IX—IX of FIG. 7;

FIG. 10 is a plan view of a block mold with open upper and lower lids, showing parts of the upper and lower lids;

FIG. 13a is a section taken along the line XIIIa—XIIIa of FIG. 10;

DETAILED DESCRIPTION OF THE INVENTION

Figure 2:
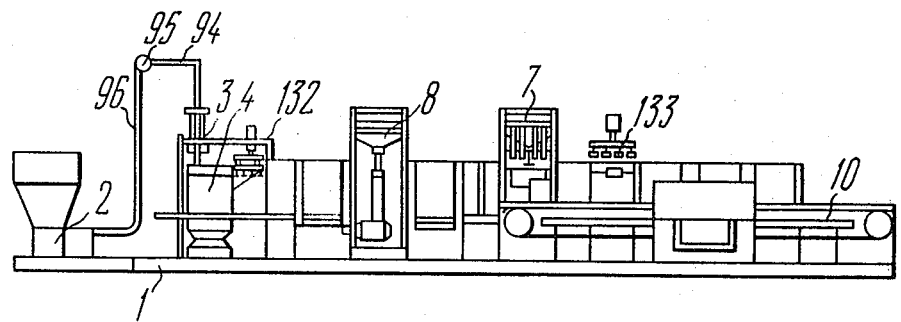
FIG. 2 is a view taken on arrow A of FIG. 1.
Figure 1:
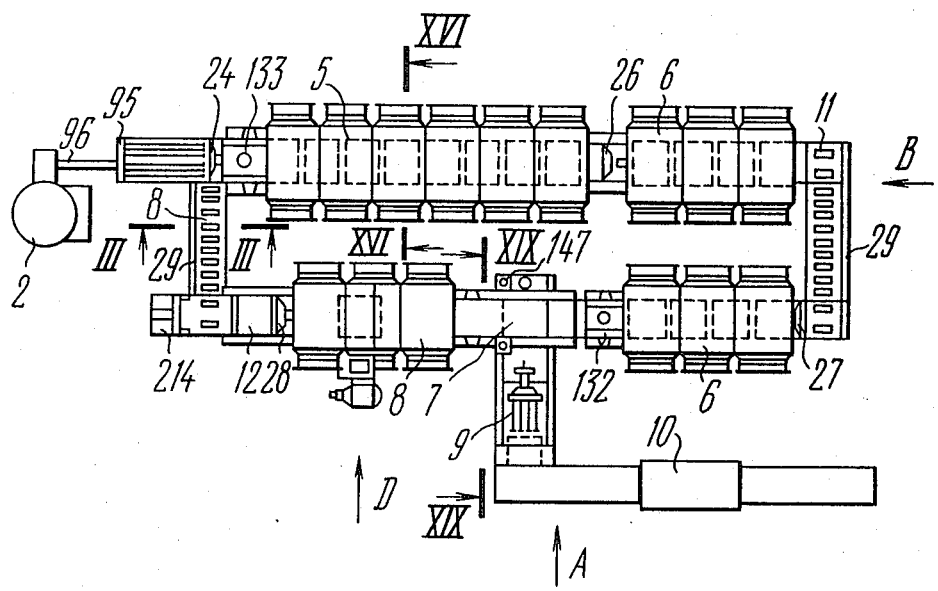
FIG. 1 is a plan view of a sausage production line according to the present invention.

Referring now to FIG. 1 of the accompanying drawings, the herein disclosed sausage production line comprises, mounted on a frame-type bedplate 1 in a closed loop in the direction of production flow, a sausage meat feeder 2, sausage meat filling and batching means 3, block molds 4, chambers 5 and 6 (FIG. 2) for heat and cold treatment of the finished product, respectively, means 7 (FIG. 1) for discharging the finished product and means 8 for washing the block molds.

Connected on-line with the means 7 for discharging the finished product is means 9 (FIG. 2) for reloading the finished product. Provided at the end of the means 9, in the direction of production flow is means 10 for surface heat treatment of the finished product.

According to the present invention, the closed loop is formed by step-type conveyers 11 and 12 arranged in two parallel rows located in a single plane, the pitch of each of said conveyers being limited by the dimensions of a single block mold 4, said conveyers serving to move the block molds 4 from the sausage meat filling and batching means 3 via the chambers 5 and 6 for heat and cold treatment of the finished product, the means 7 for discharging the finished product and means 8 for washing the block molds to the sausage filling and batching means 3.

Figure 3:
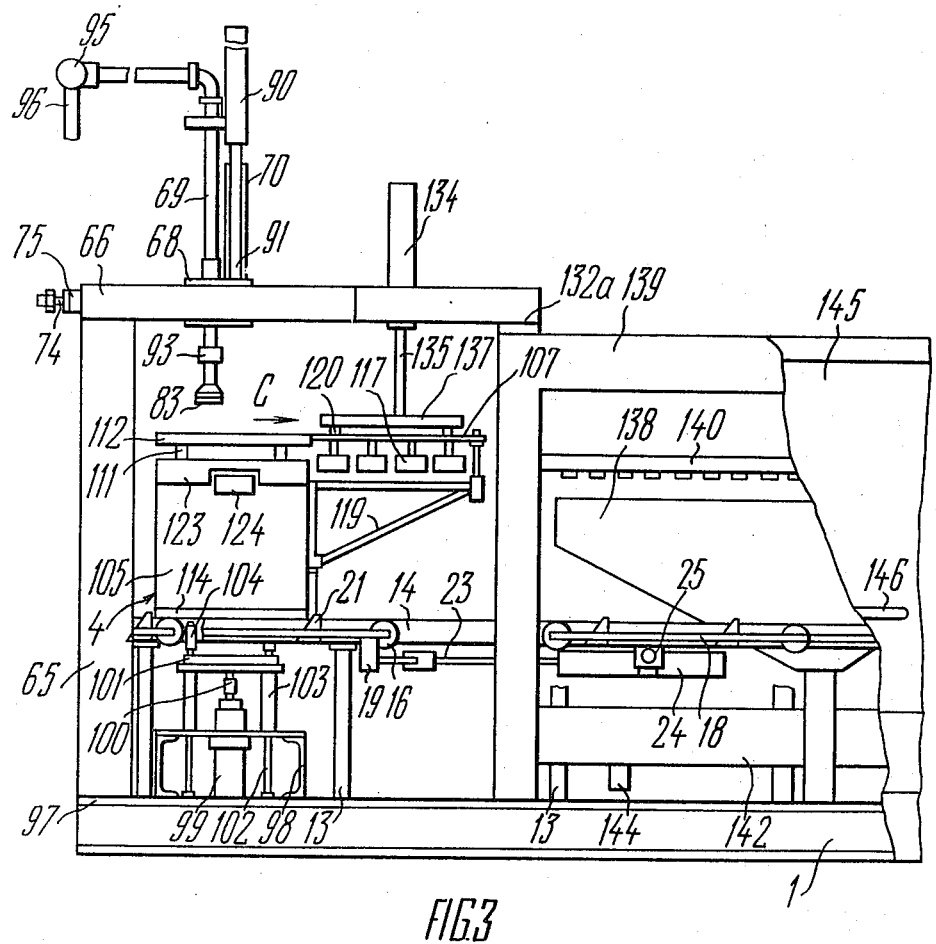
FIG. 3 is a section taken along the line III—III of FIG. 1.
Figure 4:
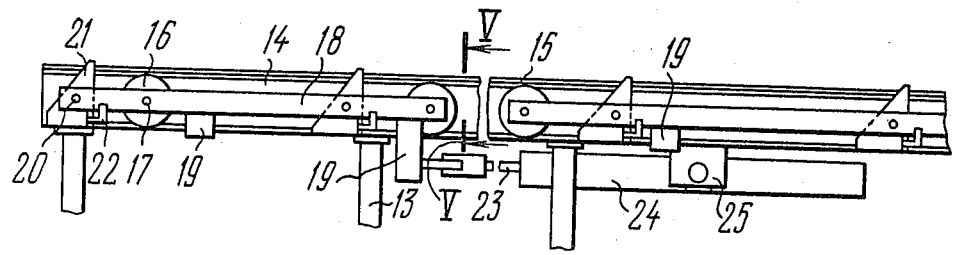
FIG. 4 is a partial front view of a step-type conveyor according to the present invention.
Figure 5:
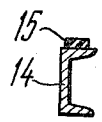
FIG. 5 is a section taken along the line V—V of FIG. 4.

The step-type conveyers 11 and 12 include supports 13 (FIG. 3) fixed to the bedplate 1 and accommodating channel-shaped guides 14 (FIG. 4). Placed on top of the guides 14 in order to reduce the sliding friction movement of the block mold 4 along said guides are strips 15 of polymeric material. On the sides of the guides 14 there are mounted rollers 16 (FIG. 5) whose axles 17 are secured on cleats 18 interconnected by cross-pieces 19. Attached to the cleats 18 by means of axles 20 are cams 21 having their center of gravity below their rotation axis 20.

In order to preclude the cranking of the cam 21 upon the movement of the block mold 4, rests 22 are provided on the cleats 18. One of the cross-pieces 19 is rigidly coupled with a rod 23 of a hydraulic cylinder 24 mounted in bearings 25 secured between the guides 14.

The step-type conveyer 11 further includes a hydraulic cylinder 26 (FIG. 2) which, thanks to the great length of the cleats 18 which carry the rollers 16, cams 21 and rests 22, moves the block molds 4 in the chambers 5 and 6 for heat and cold treatment.

The step-type conveyer 12 includes a hydraulic cylinder 27 intended for moving the block mold 4 within the cold treatment chamber 6, and a hydraulic cylinder 28 intended for moving the block mold 4 through the discharge means 7 and means 8 for washing the block molds 4.

The step-type conveyers 11 and 12 are interconnected at the ends of their rows by means of roller trains 29 for lifting and lowering the block molds 4 above the planes of the conveyers 11 and 12 and for shifting the block molds 4 from one row of the conveyers 11 or 12 to the other one in the direction of production flow.

Figure 6:
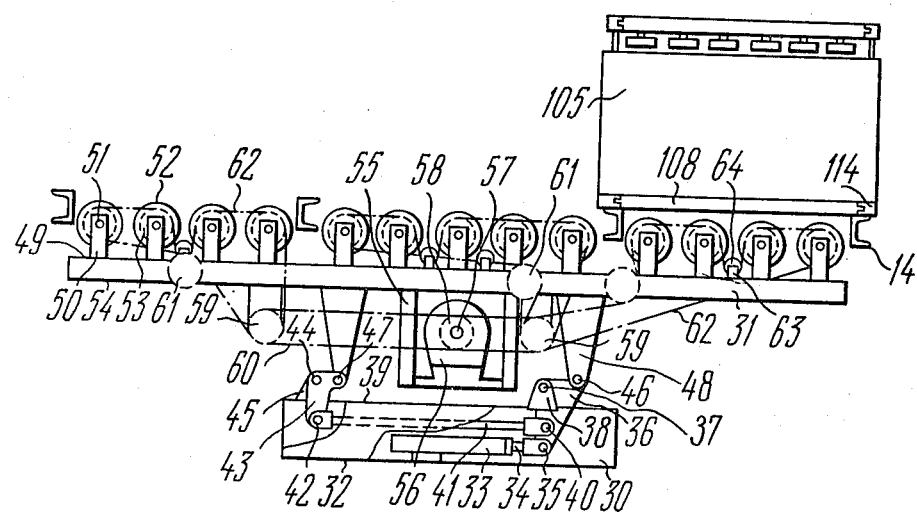
FIG. 6 is a view taken on arrow B of FIG. 1.

Each one of the roller trains 29 (FIG. 6) includes a stationary frame 30 and a movable frame 31 located one above the other. Mounted on the stationary lower frame 30, on the bottom base 32 thereof, is a hydraulic cylinder 33 whose rod 34 is connected by means of an axle 35 with plates 36 located at the sides of the stationary frame 30. The plates 36 are turnable about an axle 37 secured in bearings 38 mounted in the top portion 39 of the stationary frame 30, at one end of said frame. The plates 36 are further connected by means of an axle 40 to a bar 41 which, in turn, is connected by means of an axle 42 with plates 43. The plates 43 are turnable about an axle 44 secured in bearings 45 mounted in the top portion 39 of the stationary frame 30, at the other end thereof. The plates 36 and 43 are connected by means of axles 46 and 47 to brackets 48 secured at the sides of the movable frame 31. The top base 49 of the movable frame 31 has, at both sides thereof, bearings 50 between which rollers 52 are set on axles 51, with sprockets 53 attached to the axles 51 at the ends of said rollers 52 in order to provide for rotation of the latter. An electric motor 56 is mounted in the bottom portion 54 of the movable frame 31 in brackets 55 secured thereon, a sprocket 58 being fixedly set on a shaft 57 of said motor. Two intermediate pairs of sprockets 59 are secured on the movable frame 31 to provide for desired rotation of the rollers 52, one of the sprockets 59 of each pair being connected with the aid of a chain 60 to the sprocket 58 set on the shaft 57 of the electric motor 56. The other one of the sprockets 59 of each pair acts, by means of chains 62 and via sprockets 61 secured on the movable frame 31, to effect the rotation of the sprockets 53.

For tensioning the chains 62, rollers 64 are mounted for rotation in bearings 63 on the top base 49 of the frame 31, said rollers being encompassed by the chains 62.

Figure 7:
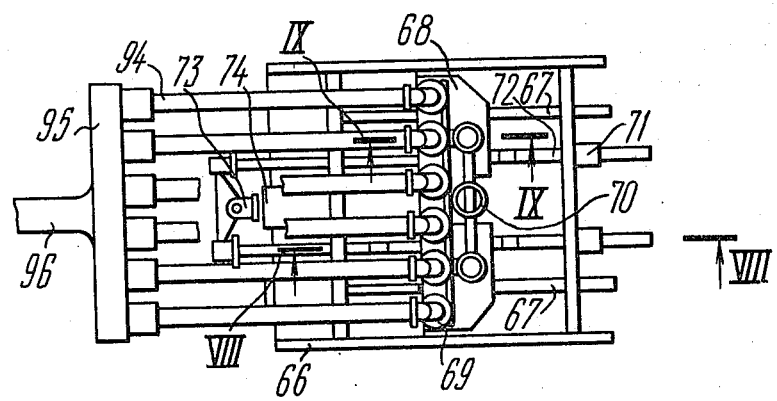
FIG. 7 is a plan view of means for filling and batching sausage meat into a block mold, according to the present invention.

The sausage meat filling and batching means 3 (FIG. 3) includes a frame 65 mounted on the bedplate 1, and further includes horizontally extending guides 67 (FIG. 7) located on a top base 66 of the latter frame, said guides accommodating a plate 68 carrying vertically extending spindles 69 and a hydraulic cylinder 70 whose rod is coupled kinematically with the spindles 69 to ensure the lowering of the latter in the course of filling and batching the block mold 4, as well as a mechanism for row-by-row shifting of the spindles 69.

Figure 8:
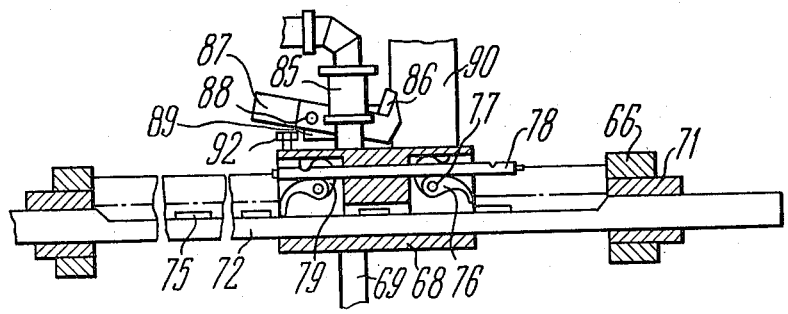
FIG. 8 is a section taken along the line VIII—VIII of FIG. 7.

The mechanism for row-by-row shifting of the spindles 69 includes bars 72 horizontally mounted on bearings 71 of the top base 66 of the frame 65, one end of each one of said bars being connected to a rod 73 of a hydraulic cylinder 74 mounted on the top base 66 of the frame 65 to provide for reciprocation of the bars 72. The bars 72 carry rests 75 (FIG. 8) adapted to cooperate with pawls 76 provided in the plate 68 for row-by-row shifting of the spindles 69 and capable of turning about axles 77 likewise secured in the plate 68.

The mechanism for row-by-row shifting of the spindles further includes pins 78 located for longitudinal movement, in the plate 68 in parallel with the bars 72, said pins having at their ends grooves designed to receive ends of springs 79 whose other ends are rigidly coupled with the pawls 76.

Mounted in rubber rings 80 (FIG. 9) in the plate 68 are guides 81 in which the spindles 69 are movable. Each one of the spindles 69 has at its lower end ports for the outlet of sausage meat and grooves adapted for the passage therethrough of a pin 82 secured on a piston 83 capable of vertical displacement relative to the spindle 69 through the value of the groove of the spindle 69. Rubber rings 84 are provided on the external surface of the piston 83, designed to preclude deformation of the piston 83 upon batching and filling the block mold 4 with sausage meat. In addition, the spindles 69 are provided in the top portion thereof with sleeves 85 (FIG. 8) rigidly coupled with said spindles and having projections.

In the uppermost position of the spindles 69 the sleeves 85 are in mesh with grips 86 having at their end a counterweight 87. The grips 86 are capable of turning about an axle 88 secured on brackets 89. The brackets 89 are secured on sliders 90 movable in guides 91 vertically extending on the plate 68 and coupled with the hydraulic cylinder 70 designed for lifting and lowering the spindles 69. For disengaging the grips 86 from the sleeves 85 of the spindles 69 by turning about the axle 88, the plate 68 has bolts 92. In the bottom portion of the guides 81 provision is made of a nut 93 designed to control a batch of sausage meat when filling and batching the block mold 4.

The spindles 69 terminate in their upper portion with flexible hoses 94 communicating with a manifold 95 (FIG. 1) designed for the distribution of sausage meat supply. The manifold 95 is connected by means of a pipe 96 with the sausage meat feeder 2.

Mounted on the bottom base 97 (FIG. 3) of the frame 65 in bearings 98 is a hydraulic cylinder 99 designed for lifting and lowering the block mold 4. On a rod 100 of the hydraulic cylinder 99 is secured a platform 101 having vertically extending guides 102 movable in conductor pipes 103.

On the platform 101 there are symmetrically arranged tapered pins 104 required for fixing the block mold 4.

Figure 12:
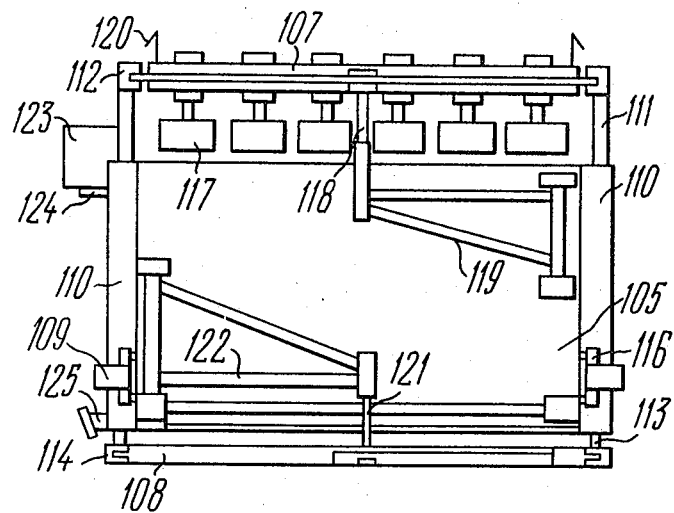
FIG. 12. is a front view of FIG. 10.
Figure 11:
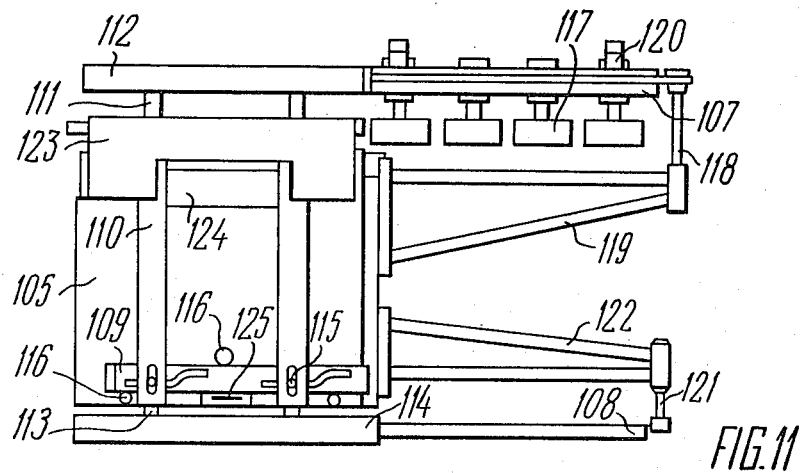
FIG. 11. is a side view of FIG. 10.

The block mold 4 includes a housing 105 (FIG. 10) accommodating vertical rows of molds 106 said housing containing whose upper lids 107 are mounted for movement in horizontal and vertical planes while their lower lids 108 are mounted for movement in a horizontal plane, the block mold further including cleats 109 (FIGS. 11, 12) attached to the housing 105 and adapted to press the lower lids 108 against the housing 105.

Rigidly fixed on the sides of the block mold 4 are two pairs of tubular guides 110 in whose upper portion there are provided tie rods 111 connected with guides 112 in which the upper lid 107 of the block mold 4 is movable. In the lower portion of the tubular guides 110 there are provided tie rods 113 coupled with guides 114 in which the lower lid 108 of the block mold 4 is movable. For limiting the stroke of the tie rods 113 coupled with the guides 114 of the lower lid 108, grooves are provided in the lower portion of the tubular guides 110, said grooves receiving pins 115 (FIG. 11) inserted therein and attached to the tie rods 113. Vertical movement of the pins 115 in the grooves is effected by horizontal displacement of the cleats 109 having shaped slots and passing through openings provided in the tubular guides 110, the pins 115 moving in the shaped slots. In order to preclude the skewing of the cleats 109, support rollers 116 are attached to the housing above and below the cleats 109, said rollers being in contact with the cleats. One end of each one of the cleats 109 is bent at 90°.

The upper lid 107 includes compacting pistons 117 capable of vertical movement. The upper lid 107 is further provided with a groove in which there moves a pin 118 attached to a swivel bracket 119. The bracket 119 is attached to the housing 105 of the block mold 4 and designed to support the upper lid 107 when the block mold 4 is open. Angular projections 120 are symmetrically arranged at the edges of the upper lid 107.

The lower lid 108 is likewise provided with a groove in which there moves a pin 121 attached to a swivel bracket 122. The bracket 122 is attached to the housing 105 of the block mold 4 and designed to support the lower lid 108 when the block mold 4 is open.

Provided on one of the sides of the block mold housing 105 in the top portion thereof is a pocket 123 for supplying the coolant and a pocket 124 for draining the coolant. A valve 12 located in the bottom portion of the housing 105 is intended for rapidly draining the coolant.

Figure 13:
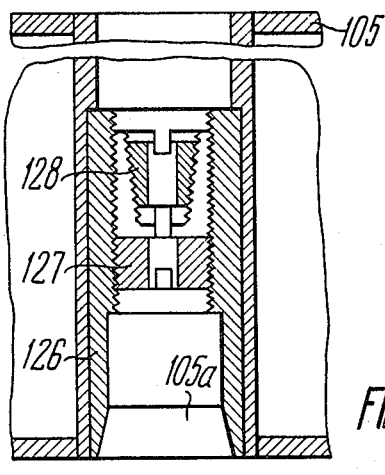
FIG. 13 is a section taken along the line XIII—XIII of FIG. 10.

Adjustment holes 105a and 108a are provided in the housing 105 and lower lid 108 for securing the block mold in position, as well as for lifting and lowering the block mold to the filling and batching position. Secured in the adjustment holes 105a of the housing 105 are sleeves 126 (FIG. 13) with tapered guides, and adjusting screw 127 and a clamp screw 128.

Guide sleeves 129 are secured in the adjustment holes 108a of the lower lid 108.

Figure 14:
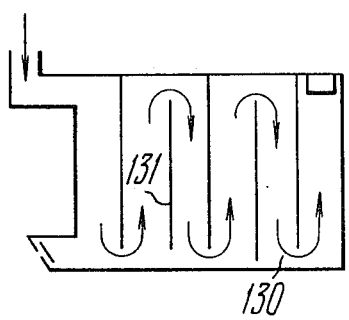
FIG. 14 is a section taken along the line XIV—XIV of FIG. 10.
Figure 14A:
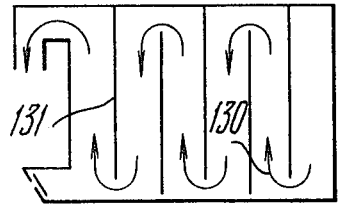
FIG. 14a is a section taken along the line XIVa—XIVa of FIG. 10.

Provided inside the housing 105 of the block mold 4 between the molds 106 are longitudinal 130 (FIG. 14) and lateral 131 partitions designed to define the direction of coolant flow in during the course of thermal treatment.

Figure 15:
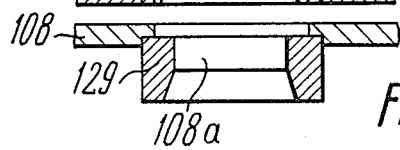
FIG. 15 is a section taken on arrow C of FIG. 3, showing the grip means for opening and closing the upper lid.
Figure 15:
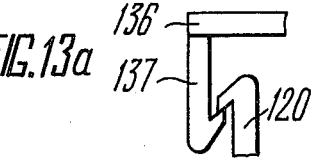

The sausage production line of the invention further includes means 132 (FIG. 2) for opening and means 133 (FIG. 1) for closing the upper lids 107 of the block molds 4, said means including a hydraulic cylinder 134 (FIG. 3) mounted on a frame 132a, to whose rod 135 there is attached a cross-piece 136 (FIG. 15) carrying grips 137 provided with chamfers adapted to cooperate with the upper lids 107 upon the movement of the latter in a vertical plane in the course of being opened and closed.

The chambers 5 (FIG. 2) and 6 for heat and cold treatment have coolant collectors 138 shaped as inverted prisms, located on the sides of the chambers 5 and 6 and communicating with the coolant outlet from the block mold 4. The heat and cold treatment chambers 5 and 6 include a housing 139 mounted on the frame-type bedplate 1, a manifold 140 with holes located on the same side with the collectors 138 over the entire length of the chambers 5 and 6, and a drip pan 142 for condensed moisture secured to the housing 139 by means of a bracket 141. The collector 138 has a pipe 143 for returning the coolant to the recirculating system of the conveyers 11 and 12. The drip pan 142 has holes for the supports of the step-type conveyers 11 and 12. For draining the condensed moisture, the drip pan 142 is provided with a branch pipe 144 (FIG. 3). For control over the movement of the block mold 4, doors 145 with handles 146 are provided in the heat and cold treatment chambers 5 and 6. The doors 145 are capable of vertical movement within the housing 139 of the chambers 5 and 6.

Figure 17:
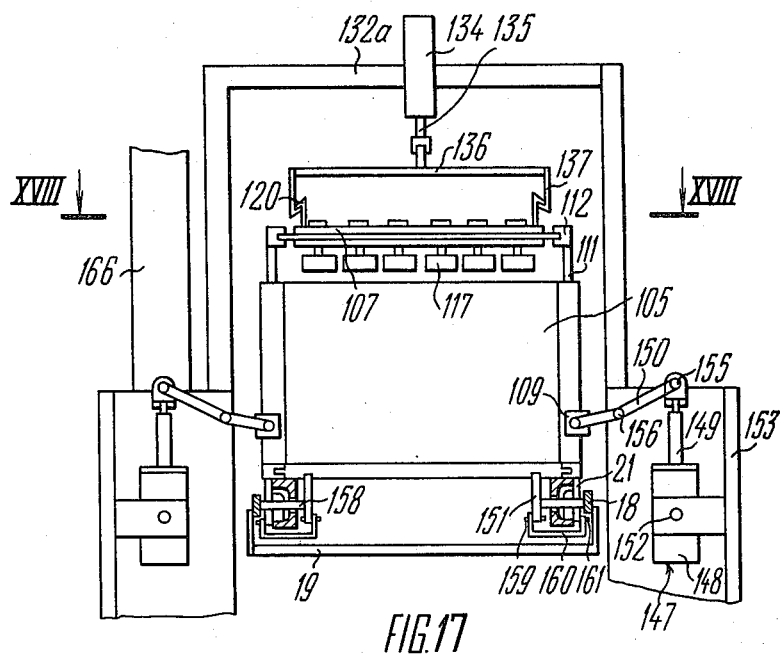
FIG. 17 is a general view of the means for opening the upper lid and means for opening the lower lid, shown in the direction of the block mold movement.
Figure 16:
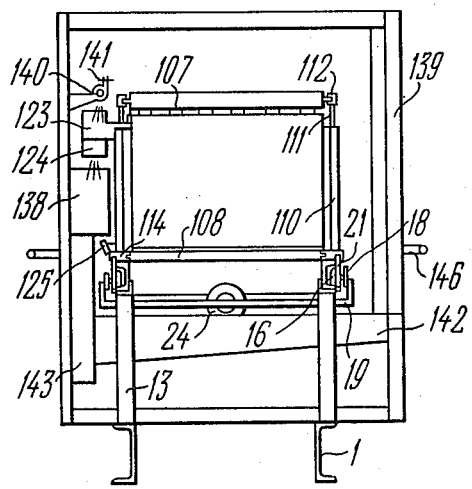
FIG. 16 is a section taken on the line XVI—XVI of FIG. 1.
Figure 18:
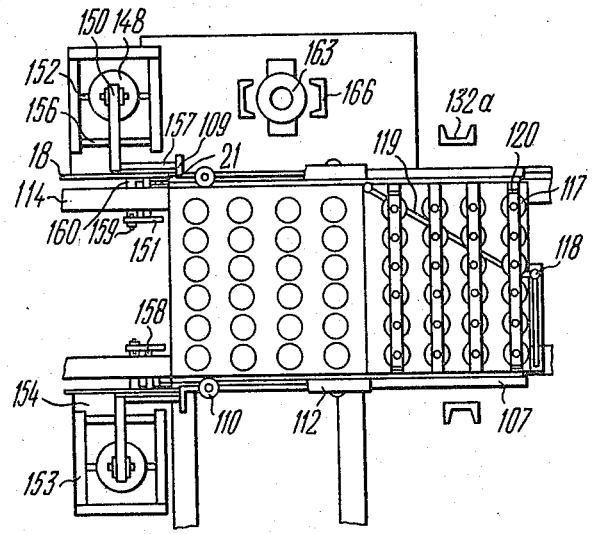
FIG. 18 is a section taken on the line XVIII—XVIII of FIG. 17.

The herein disclosed production line is provided with means 147 (FIGS. 17, 18) for opening the lower lid 108 of the block mold 4, which includes two hydraulic cylinders 148 arranged symmetrically on the sides of the step-type conveyer 12, rods 149 of said cylinders carrying levers 150 mounted thereon for turning in a vertical plane and adapted to rest against the cleats 109 of the block mold 4 and, upon movement of the block mold 4 over the step-type conveyer 12, lift the block molding housing 105, said latter means further including cams 151 coupled kinematically with the step-type conveyer 12 and cooperating with the lower lid 108 in the course of movement of the conveyer 12. The hydraulic cylinders 148 are secured by means of axles 152 in bearings 153 mounted on a frame 154 (FIG. 17) arranged at the sides of the step-type conveyer 12; the hydraulic cylinders 148 are capable of turning about the axles 152. The levers 150 mounted on the rods 149 with the aid of axles 155 are turnable about axles 156 secured in the bearings 153. The levers 150 are provided at the ends with adjustable stops 157 (FIG. 18).

The cams 151 positioned between the guides 14 of the conveyer 12 are connected by means of an axle 158 (FIG. 17) to the cleats 18 and are capable of turning movement.

The cams 151 of the means 147 for opening the lower lid 108 of the block mold 4 are connected in their lower portion by means of axles 159, tie rods 160 and axles 161 with the cams 21 of the step-type conveyer 12. In so doing, the cams 151 are kinematically connected only with those cams 21 of the step-type conveyer 12 which move within the range of the discharging means 7. For moving the cams 151, which are coupled with the cleats 18 of the conveyer 12 by means of the axle 158, in the guides 14 provision is made of for a groove whose length equals that of the pitch of the conveyer 12.

The production line of the invention further includes means 9 for reloading the finished product from the discharging means 7 into the surface heat treatment means 10.

Figure 19:
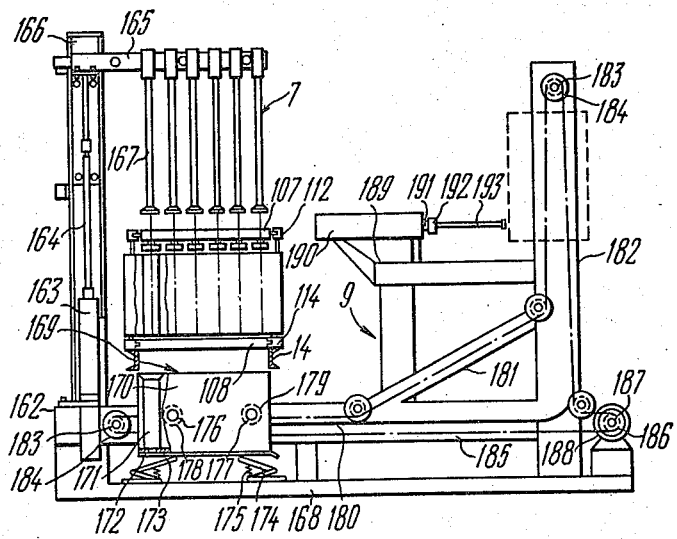
FIG. 19 is a section taken along the line XIX—XIX of FIG. 1.

The discharging means 7 includes a frame 162 (FIG. 19) on which there is secured a vertically extending hydraulic cylinder 163 whose rod 164 is coupled with a crossbar 165 movable in guides 166. Attached to the crossbar 165 are bars 167 intended for pushing loaves of product out of the block mold 4. The number of the bars 167 corresponds to that of the molds in the block mold 4.

The reloading means 9 has a frame 168 connected to the frame 162 of the means 7 for discharging the finished product.

The means 9 for reloading the finished product includes a receiver 169 having a body 170 and fashioned as cylindrical sleeves 171 whose shape corresponds to that of the finished product, i.e., loaves, said sleeves having bottoms 172 with openings overlapped from below by a plate 173.

The plate 173 is urged against the bottom 172 of the receiver 169 by means of levers 174 with springs 175.

Secured in pairs on axles 176 and 177 at the sides of the body 170 for turning movement are rollers 178 and 179. For moving the receiver 169 by means of the rollers 178 and 179, the frame 169 is provided with horizontally extending guides 180, inclined guides 181 and vertically extending guides 182, all of said guides arranged in pairs on said frame. Arranged in pairs on the frame 168 at the appropriate points of transition of guides 180, 181 and 182 to the others are sprockets 184 set on axles 183 and encompassed by chains 185, the chain being driven from sprockets 186 set on a shaft 187 of a motor 188 mounted on the frame 168.

The axles 176 of the rollers 178 are fixed on the chains 185. For pushing the product out of the receiver 169 when the latter is in a vertical plane, a hydraulic cylinder 190 is secured on a top base 189 of the frame 168, a rod 191 of said cylinder having a cross-piece 192 with a series of pushers 193.

Figure 20:
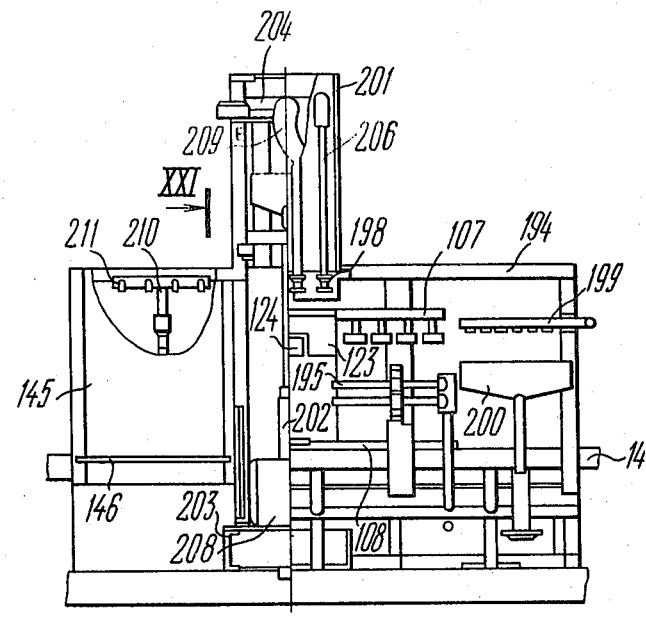
FIG. 20 is a fragmentary view taken on arrow D of FIG. 1.
Figure 21:
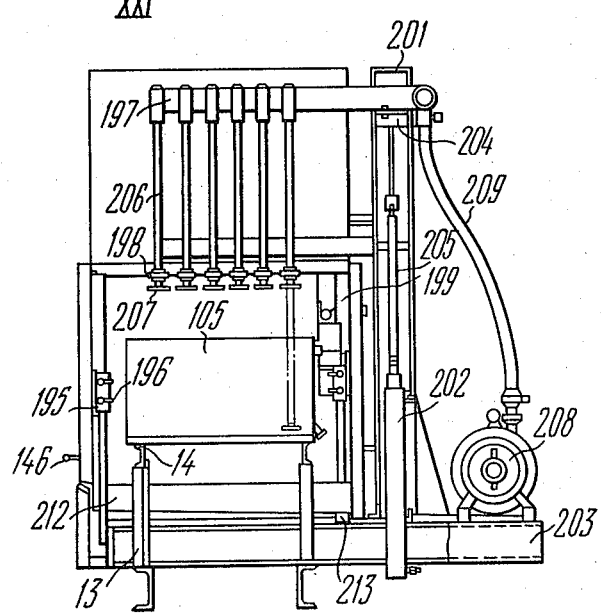
FIG. 21 is a section taken along the line XXI—XXI of FIG. 20.

The means 8 for washing the block molds 4 (FIG. 1) includes a chamber 194 (FIG. 20) designed to accommodate a block mold 4 to be washed and provided on the sides of the block mold 4 with manifolds 195 with nozzles 196 (FIG. 21) for washing the housing 105 and lids 107 and 108 of the block mold 4, and further provided with manifolds 197 with nozzles 198 mounted for vertical movement for washing the molds 106 of the block mold 4.

Provided at the inlet to the chamber 194 is a pipe 199 designed for supplying the coolant to the block mold 4 for preheating the latter, and a collector 200 for draining the coolant. The manifold 197 is movable in vertically extending guides 201 by means of a hydraulic cylinder 202 mounted on a frame 203 of the means 8 for washing the block molds 4.

The hydraulic cylinder 202 is connected to the manifold 197 by means of a cross-piece 204 attached to a rod 205 of the hydraulic cylinder 202.

The manifold 197 includes bars 206 to whose ends are attached the nozzles 198 and rubber scrapers 207 for mechanical treatment of the molds of the block mold 4. The number of the bars 206 corresponds to that of the molds in the block mold 4.

For supplying the washing medium to the manifold 197, a hydraulic pump 208 is mounted on the frame 203, said pump connected with the manifold 197 by a hose 209. The supply of the washing medium to the manifold 195 is likewise effected by the hydraulic pump 208. At the outlet from the chamber 194 in the top portion thereof above the conveyer 12 there is positioned a row of manifolds 210 with nozzles 211 designed for flushing the block mold 4 with running water.

For collecting the washing medium, the bottom portion of the chamber 194 is provided with a drip pan 212 with a branch pipe 213 for draining said medium to sewerage.

Figure 22:
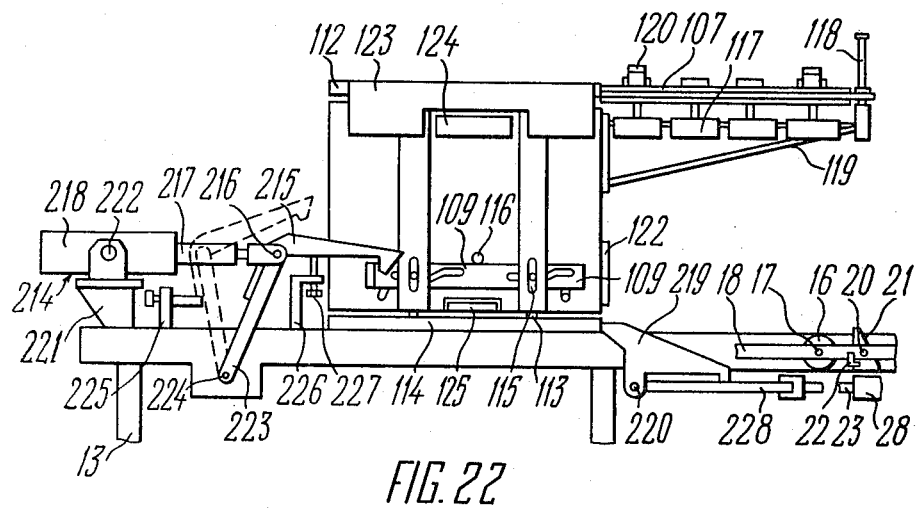
FIG. 22 is a general view of the means for closing the lower lid, taken on arrow E of FIG. 1 (the roller train not shown).

Means 214 for closing the lower lid 108 of the block mold 4 includes grips 215 (FIG. 22) arranged symmetrically on the sides of the step-type conveyer 12 and loose-fitted on a single axle 216 coupled with a rod 217 of a hydraulic cylinder 218 mounted on the step-type conveyer 12, and cams 219 secured on the step-type conveyer 12, said cams having their center of gravity below their rotation axis 200 and cooperating with the lower lid 108 in the course of movement of the conveyer 12.

The hydraulic cylinder 218 is located between the guides 14 of the conveyer 12 in bearings 221 with a possibility of turning about axles 222.

In order to preclude the skewing of the grips 215, they are connected by means of the axle 216 to levers 223 which are turnable about axles 224 secured on the guides 14. Supports 225 and 226 with adjuster bolts 227 are mounted on the guides 14 for adjusting the position of the grips 215 and levers 223.

The cams 219 are secured by means of the axle 220 on a platform 228 rigidly coupled to the rod 23 of the hydraulic cylinder 28.

The herein disclosed sausage production line operates in the following manner.

The block mold 4 with the open upper lid 107 is set in the filling and batching position while the automatic control system commands the hydraulic cylinder 134 to lower the rod 135 carrying the cross-piece 136 whose grips 137 engage the projections 120 of the block mold 4.

Then, the rod 135 moves upwards to lift the upper lid 107, one side of the upper lid 107 received in the guides 112 also acting to slightly said guides while the tie rods 111 of the guides 112 move in the tubular guides 110. The other side of the upper lid 107 moves, during the movement of the rod 135, in the groove over the pin 118 attached to the bracket 119.

Thereupon, the hydraulic cylinder 99 of the filling and batching means 3 acts upon a command from the automatic control system to raise the block mold 4 by means of the tapered pins 104 secured on the platform 101, said tapered pins 104 entering the adjustment holes 105a and 108a of the block mold 4 to secure the latter in position by means of the guide sleeves 129 of the lower lid 108 and sleeves 126 with tapered guides. The block mold 4 is raised to a position in which its molds 106 receive the pistons 83. After that, the hydraulic cylinder 70 of the filling and batching means 3 is ordered to move the sliders 90 in the guides 91, said sliders carrying the brackets 89 on whose axles 88 are set the grips 86 meshing with the sleeves 85 of the spindles 69. The spindles 69 move in the guides 81 of the plate 68 to the lowermost position in which the grips 86 get out of mesh with the sleeve 85 as a result of the pressure exerted by the counterweight 87 upon the bolt 92 and of the turning of the grips 86 about the axle 88. In so doing, the pistons 83 having the pins 82, when pressed against the surface of the lower lid 108, move relative to the spindles 69 to the upper position, thereby opening the ports of the spindles 69. This is followed by a command to actuate the feeder 2, and sausage meat is supplied via the pipe 96 through the manifold 95 via the flexible hoses 94 and spindles 69 to the molds 106 under the piston 83. The forcing-out pressure of sausage meat causes the pistons 83 with spindles 69 to move upwards until the pistons 83 come to rest against the nuts 93. The spindles 69 move upwards independently of each other, the sausage meat supply ceasing when all of the spindles reach their upper position. On receiving an appropriate command, the hydraulic cylinder 70 moves along the guides 91, the slider 90 and the grips 86 associated therewith via the brackets 89 and axles 88, said grips coming in their upper position meshing with the sleeves 85 of the spindles 69. Upon meshing the sleeves 85, the grips 86 move the spindles 69 through a distance equal to the length of groove of the spindles 69, the ports of the spindles 69 being overlapped by the pistons 83 which rest against the nuts 93.

Thereafter, the hydraulic cylinder 99 receives a command to lower the block mold 4 such that the pistons 83 be above the housing 105 of the block mold 4. This is followed by a command to the hydraulic cylinder 74 of the mechanism for row-by-row shifting of the spindles 69, whose rod 73 helps move the bars 72 in the bearings 71, the rests 75 of said bars coming to contact with the pawls 76 to cause the plate 68 to move in the guides 67 in the desired direction through a value equal to the interaxial distance of the molds 106.

The rod 73 of the hydraulic cylinder 74 performs a return stroke and the bars 72 return to the initial position, while the plate 68 with the spindles 69 becomes positioned above the following row of the molds 106. Then, there follows a command to the hydraulic cylinder 99 to once again raise the block mold 4 to the upper position in which the pistons 83 are received by the molds 106. The cycle of filling the molds 106 is repeated. In this manner, all of the molds 106 of the block mold 4 are filled row-by-row. When the plate 68 is in the outermost position, the pin 78 rests against the frame 65 of the top base 66 and shifts. The springs 79 of the pawls 76 in contact with the rests 75 during displacement of the bars 72 move out of the grooves of the pins 78 to turn the pawls 76 about the axle 77, thereby raising the pawls 76 above the bars 72. In so doing, the springs 79 of the pawls 76 which were out of contact with the rests 75 sink into the grooves or the pins 78 to turn the pawls 76 about the axle 77, thereby lowering the pawls 76 onto the bars 72.

The plate 68 will now move upon the return stroke of the rod 73 of the hydraulic cylinder 74. Thus, the filling of the molds 106 of the subsequent block mold 4 will be done with the plate 68 in the outermost position in which the filling and batching of the preceding block mold 4 was completed.

In the course of filling and batching the block mold 4, the upper lid 107 and the guides 112 remain stationary, while the housing 105 with the tubular guides of the block mold 4 moves relative to the tie rods 111.

After all of the molds 106 have been filled with sausage meat, there follows a command to the hydraulic cylinder 99 to lower the block mold 4 down onto the guides 14 of the step-type conveyer 11, with the tapered pins 104 leaving the adjustment holes 105a and 108a of the housing 105 and lower lid 108 of the block mold 4.

On command from the hydraulic cylinder 24 through the rod 23 cross-piece 19, cleats 18 and the axles 20 carrying the cams 21, said cams set in motion the block mold 4 along the guides 14. Upon the movement of the block mold 4, the cams 21 are thrust against the rests 22. For their smooth movement, the cleats 18 are provided with the rollers 16 secured on the axles 17.

While moving the block mold 4 from the filling and batching position, the upper lid 107 is immovable and the guides 112 enter said lid 107, while the bracket 119 attached to the housing 105 turns and the pin 118 slides in the groove of the upper lid 107. Upon full stroke of the rod 23 of the hydraulic cylinder 24, the bracket 119 presses against the side of the block mold 4 and the molds 106 are positioned below the pistons 117. After another command, the rod 23 of the hydraulic cylinder 24 performs a return stroke, with the cams 21 that are loose-fitted on the axles 20 passing beneath the guides 114. After passing beneath the guides 114, the cams 21 return to their initial position owing to the fact that they have their center of gravity located below their rotation axis 20.

After the molds 106 have been positioned below the pistons 117, the rod 135 of the hydraulic cylinder 134 is commanded to move downwards and, with the aid of the grips 137 in mesh with the projections 120, acts to lower the upper lid 107 such that the pistons 117 enter the molds 106.

Upon closing of the upper lid 107, the grips 137 come out of mesh with the projections 120.

Further, the rod 23 of the hydraulic cylinder 24 receives a command to move the block mold 4 to the heat treatment chamber 5 by means of the cams 21, after which another command causes the rod 135 of the hydraulic cylinder 134 carrying a crosspiece 136 with the grips 137 to move upwards.

On command, the rod 23 of the hydraulic cylinder 24 acts to move the cleat 18 with the cams 21 to the initial position.

In the heat treatment chamber 5, coolant is continuously fed from the manifold 140 secured in the brackets 141 to the pocket 123 of the block mold 4, which coolant, due to the longitudinal 130 and lateral 131 partitions, flows around the molds 106 and is drained from the pocket 124 into the inverted prism-shaped collector 138 from which it is supplied to recirculation via the pipe 143.

Condensed moisture is collected in the drip pan 142 and drained to sewerage via the branch pipe 144.

In the heat treatment chamber 5 and cold treatment chamber 6, the block mold 4 moves intermittently over the step-type conveyor 11 while the hydraulic cylinder 26 performs double strokes on receiving appropriate commands.

The block molds 4 pass though the heat treatment chamber 5 within a period of time required to heat the product to the desired temperature.

On leaving the chamber 5, coolant is rapidly drained from the block mold 4 through the valve 125. Then, the block mold 4 moves over the step-type conveyor 11 to the cold treatment chamber 6 wherein coolant is supplied to the pockets 123 of the block mold 4 from the manifold 140. After passing the first section of the cold treatment chamber 6, the block mold 4 leaves it to be positioned below the rollers 52 of the roller train 29. Then, there follows a command to the rod 34 of the hydraulic cylinder 33 mounted on the bottom base 32 of the stationary frame 30 of the roller train 29 to move and turn the plate 36, to which the bar 41 is attached on the axle 40, about the axle 37 attached to the bracket 38. The bar 41, by means of the axle 42, turns the plate 43 about the axle 44 attached to the bracket 45. Upon turning the plates 36 and 43, the brackets 48 associated therewith through the axles 46 and 47 raise the movable frame 31 of the roller train 29, and the block mold 4 becomes positioned on the rollers 52 above the guides 14 of the conveyer 11.

The electric motor 56, whose shaft 57 transmits the effort via the sprocket 58 and chains 60 to the intermediate pairs of sprockets 59, is actuated. Rotation from the sprockets 59 is transmitted via the chains 62 and sprockets 61 to the sprockets 53 which are connected to the rollers 52 through the axles 51. The block mold 4 is moved over the roller train 29 to be positioned above the guides 14 of the step-type conveyor 12. On command, the electric motor 56 is switched off. There then follows a command to the rod 34 of the hydraulic cylinder 33 to perform a return stroke, the movable frame 31 of the roller train 29 is lowered and the block mold 4 is positioned on the guides 14 of the step-type conveyor 12.

On command, the hydraulic cylinder 27 of the step-type conveyor 12 moves the block mold 4 to the second section of the cold treatment chamber 6. On leaving the cold treatment chamber 6, the block mold 4 is located below the hydraulic cylinder 134 of the means 133 for opening the upper lid. On command, the rod 135 acts to lower the cross-piece 136 with the grips 137 which come in mesh with the projections 120 of the upper lid 107 of the block mold 4 and then, on another command, to raise and secure in position the upper lid 107. The upper lid 107 is raised together with the guides 112 in which it is placed, while the tie rods 111 move in the tubular guides 110.

There follows a command to the rod 23 of the hydraulic cylinder 27 to return to the initial position (the rod 23 is pushed-in).

Following an appropriate command, the hydraulic cylinder 28 moves the block mold 4 to the discharging means 7, while the upper lid 107 moves out of the guides 112 and the bracket 119 turns owing to the movement of the pin 118 in the groove of the upper lid 107.

A command issued upon the movement of the block mold 4 towards the discharging means 7 causes the rods 149 of the hydraulic cylinders 148 of the means 147 for opening the lower lid 108 to move out. In so doing, the levers 150 secured on the rods 149 by means of the axles 155 turn about the axles 156, and the stops 157 of the levers 150 are positioned such that the cleats 109 of the block mold 4 come in contact with said stops 157. Upon movement of the block mold 4, the stops 157 come to rest against the cleats 109 and shift the latter. In so doing, the pins 115 move in the shaped slots of the cleats 109 to raise the housing 105 of the block mold 4 with the aid of the tie rods 113 above the guides 114 accommodating the lower lid 108.

Upon movement of the block mold 4 towards the discharging means 7, the cams 21 of the hydraulic cylinder 28 of the step-type conveyor 12 act to effect said movement. Upon the return stroke of the hydraulic cylinder 28, an appropriate command is issued to the cams 21 to move beneath the guides 114 of the block mold 4 and, in so doing, to turn about their axle 20 and cause the cams 151 of the means 147 for opening the lower lid 108 to turn about the axle 15. The turning is effected owing to the provision of the tie rods 160 serving to interconnect the cams 151 and cams 21 by means of the axles 159 and 161. The cams 151 come into contact with the lower lid 108 to move the latter in the guides 114. When the lower lid 108 moves out, the bracket 122 attached to the housing 105 of the block mold 4 turns, owing to the movement of the pin 121 in the groove of the lower lid 108, and holds the latter in the drawn-out position.

When the lower lid 108 is fully drawn out, the cams 21 of the step-type conveyor 12 move from under the guides 114 of the block mold 4 and turn owing to the fact that their center of gravity is below their rotation axis 20, and push against the rests 22 secured on the cleats 18. While so doing, the cams 151 of the means 147 for opening the lower lid 108 turn about the axle 158 owing to the tie rods 160 and come out of contact with the lower lid 108.

Thus, the block mold has both the upper 107 and lower 108 lids drawn out in this position.

Then follows a command to the rod 164 of the hydraulic cylinders 163 of the discharging means 7 to move the crossbar 165 with the bars 167 downwards in the guides 166 and push out the finished product which gets to the sleeves 171 of the receiver 169 of the means 9 for reloading the finished product. Since the sleeves 171 have the bottoms 172 with holes which, in the product discharging position, are overlapped from below by the plate 173 by means of the levers 174 with springs 175, an air cushion is formed when pushing the product into the sleeves 171 whose shape corresponds to that of the finished product, said air cushion serving to slow down the product falling into the sleeves 171. This helps preclude the deformation of the product. After the product has been pushed out of the block mold 4, a command is issued to the rod 164 of the hydraulic cylinder 163 of the discharging means 7 to move upwards the crossbar 165 with the bars 167. Then, the block mold 4 is moved towards the means 8 for washing the block molds 4 by means of the cams 21 connected to the cleats 18 via crosspieces 19 with the rod 23 of the hydraulic cylinder 28 to which the command is issued.

After the receiver 169 has been filled with the product, a command is issued to actuate the electric motor 181, and motion is transmitted to the receiver 169 via the shaft 187, sprockets 186 and chains 185, owing to the fact that the axles 176 of the rollers 178 are secured on the chains 185. By means of the rollers 178 and 179 located on both sides of the body 170, the receiver 169 moves initially in the horizontally extending guides 180, the plate 173 remaining in position. Then, owing to the sprockets 184 located in place of transition of the horizontally extending guides 180 into inclined guides 181, the direction of movement of the chains 185 varies, thereby effecting the movement of the rollers 178 in the inclined guides 181, while the rollers 179 continue to move in the horizontally extending guides 180. Upon such movement, the receiver 169 assumes an inclined position and, in the appropriate points of transition of the inclined guides 181, vertical guides 182 and horizontal guides 180, starts to move in the vertical guides 180. In the course of its movement in the vertically extending guides 182, a command is issued to the receiver 169 to position the openings in its bottom 172 opposite the pushers 193 which are at this moment pushing the product through the openings in the bottom 172 to the means 10 for surface heat treatment of the finished product. Upon stopping, the motor 186 is switched off. The lifting of the receiver 169 continues until the last row of the product has been pushed out. After that, a command is issued to the reciver 169 to move downwardly in the vertically extending guides 182 until the point at which the vertically extending guides 182 change into the inclined guides 181, where the rollers 178 start moving in the inclined guides 181 and the rollers 179 continue to move in the vertically extending guides 182. Upon such movement, the receiver 169 assumes an inclined position and, in the appropriate points of transition of the inclined guides 181 into the horizontally extending guides 180 and of the vertically extending guides 182 into the horizontally extending ones 180, shifts over to moving in the horizontal guides 180. The displacement of the receiver 169 continues until a position is reached in which the plate 173 overlaps from below the openings of the bottom 172.

On command, the block mold 4 moves with the aid of the hydraulic cylinder 28 over the step-type conveyor 12 and enters the means 8 for washing the block mold 4. At the inlet to the chamber 194 of the means 8 for washing the block mold 4, coolant is supplied to the pocket 123 of the block mold 4 from the pipe 199, which coolant flows around the housing 105 and molds 106 to heat up the block mold 4. The coolant is drained from the pocket 124 into the collector 200 and returned for recirculation.

Then, a command is issued to the block mold 4 to move towards the manifolds 195 with nozzles 196, provided on the sides of the chamber 194 for washing the housing 105 and lids 107 and 108. The washing medium is supplied by the hydraulic pump 208. Upon further movement, the block mold 4 is positioned below the manifolds 197 to which a command is issued to perform vertical reciprocation with the aid of the rod 205 of the hydraulic cylinder 202 in the guides 201. The manifolds 197 include the bars 206 to whose ends are attached the nozzles 198 and the rubber scrapers 207 serving to clean the surfaces of the molds 106 while the nozzles serve to wash off mud particles. The washing medium is supplied to the manifolds 197, on receipt of an appropriate command, by the hydraulic pump 208 via hose 209. At the outlet from the chamber 194 the manifolds 210 with nozzles 211 serve to flush the block mold 4 with running water. The supply of the washing medium and flushing water is only effected when the block mold 4 is inside the chamber 194 of the block mold washing means 8. After that, the block mold 4 moves over to the roller train 29 and, following an appropriate command during the return stroke of the rod 23 of the hydraulic cylinder 28, the cams 219 pass underneath the housing 105 and the open lower lid 108 of the block mold 4, said cams turning at the same time about their axle 220.

On receiving an appropriate command during subsequent strokes of the rod 23 of the hydraulic cylinder 28, the block mold 4 is positioned below the rollers 52. In this position, at the end of the return stroke of the rod 23, the cams 219 return to their initial position inasmuch as their center of gravity is below their rotational axis 220. The cams 219 rest against the platform 228 and, upon further movement of the rod 23, come in contact with the lower lid 108 and push the latter in the guides 114.

After the lower lid 108 has been pushed in, a command is issued to the rod 217 of the hyraulic cylinder 218 of the means 214 for closing the lower lid 108 to move towards the block mold 4. In so doing, the grips 215 move and the levers 223 turn about the axle 224. The grips 215 engage the ends of the cleats 109 bent at 90° and, upon the return of the rod 217, move the cleats 109. In the course of this movement, the pins 115 move in the shaped slots of the cleats 109 and, owing to the effect of the tie rods coupled with the pins 115, the housing 105 of the block mold 4 is pressed tightly against the lower lid 108. At the end of the stroke of the grips 215, they come out of contact with the cleats 109 of the block mold 4, the moment of such disengagement being controlled by the bolt 227 secured on the support 226. The time required for the block mold 4 to pass over the step-type conveyor 12 the distance from the discharging means 7 to the means 214 for closing the lower lid 108 depends upon the rate of the production line operation. After the lower lid 108 has been closed, a command is issued to the hydraulic cylinder 33 of the roller train 29 to raise the movable frame 31, and the block mold 4 is positioned on the rollers 52 under the guides 14 of the step-type conveyor 11. On a subsequent command, the motor 56 is actuated to move the block mold 4 to the filling and batching means 3 and to stop the block mold above the guides 14 of the step-type conveyor 11. On command, the rod 34 of the hydraulic cylinder 33 performs a return stroke and the movable frame 31 moves downwards to lower the block mold 4 down onto the guides 14. The cycle is repeated.

The temperature control is effected after both heat and cold treatment of the product.

The operation of all of the mechanisms is controlled with the aid of an automatic control system.

What is claimed is:

1. A sausage production line comprising a sausage meat feeder, sausage meat filling and batching means mounted on a frame which includes horizontally extending guides located on a top base of said frame, said guides accommodating a plate carrying vertically extending spindles which shift on a row-by-row basis, and a hydraulic cylinder with a rod coupled kinematically to the spindles to lower said spindles during the course of filling and batching a plurality of block molds with sausage meat, wherein the block mold includes a housing accommodating vertical rows of molds, said housing containing upper lids mounted for movement in horizontal and vertical planes, and lower lids mounted for movement in a horizontal plane, said block mold further including means attached to the housing adapted to press the lower lids against said housing, means for row-by-row shifting of the spindles, chambers for heat and cold treatment of the finished product, means for discharging the finished product from said molds and means for washing the block molds, all arranged in a closed loop in the direction of production flow, the closed loop being formed by step-type conveyors arranged in two parallel rows located in a single plane, the pitch of each of said conveyors being limited by the dimensions of a single block mold, said conveyors serving to move the block molds from said means for filling and batching the sausage meat into the block molds to said chambers for heat and cold treatment of the finished product, to means for discharging the finished product, to means for washing the discharged block molds, and back to said sausage meat filling and batching means.

2. A production line as set forth in claim 1, wherein the step-type conveyers are interconnected at the ends of their rows by means of roller trains for raising the block molds above the planes of the conveyers, shifting the block molds from one row of the conveyers to the other one in the direction of production flow and lowering the block molds onto the conveyers.

3. A production line as set forth in claim 2, wherein each of the roller trains includes two frames located one above the other and interconnected by leverage means for lifting and lowering the top of the frames by means of a hydraulic cylinder mounted on the bottom of the frames.

4. A production line as set forth in claim 1, wherein the mechanism adapted for row-by-row shifting of the spindles includes horizontal bars mounted in bearings on the top base of the frame, one end of each one of said bars being connected to the rod of a hydraulic cylinder mounted on the top base of the frame to provide for reciprocation of the bars carrying rests adapted to cooperate with pawls provided in the plate for row-by-row shifting of the spindles.

5. A production line as set forth in claim 4, wherein the mechanism adapted for row-by-row shifting of the spindles includes pins located in the plate in parallel with the bars for longitudinal movement, said pins having at their ends grooves designed to receive therein ends of springs whose other ends are rigidly coupled with the pawls.

6. A production line as set forth in claim 1, wherein longitudinal and lateral partitions are provided inside the block mold housing between the molds, said partitions designed to define the direction of coolant flow in the course of thermal treatment of the finished product.

7. A production line as set forth in claim 1, wherein means for opening and closing the upper lids of the block molds comprise a hydraulic cylinder containing a rod attached a cross-piece carrying grips provided with chamfers adapted to cooperate with the upper lids upon movement of the latter in a vertical plane during the course of being opened and closed.

8. A production line as set forth in claim 1, wherein the chambers for heat and cold treatment of the finished product have coolant collectors shaped as inverted prisms, located on the sides of said chambers and communicating with a coolant outlet from the block mold.

9. A production line as set forth in claim 1, wherein means for opening the lower lid of the block mold include at least two hydraulic cylinders arranged symmetrically on the sides of the step-type conveyer, the rods of said cylinders carrying levers mounted thereon for turning in a vertical plane and adapted to rest against cleats, which upon movement of the block mold over the step-type conveyer, lift the block mold housing, and cams coupled kinematically with the step-type conveyer and cooperating with the lower lid during the course of the conveyer movement.

10. A production line as set forth in claim 1, wherein provision is made for means designed for surface heat treatment of the finished product.

11. A production line as set forth in claim 1, wherein provision is made for means designed for reloading the finished product from the means for discharging said product into means for surface heat treatment thereof.

12. A production line as set forth in claim 11, wherein the means for reloading the finished product include at least one receiver whose shape corresponds to that of the finished product and which is provided with bottoms having openings overlapped from below by a plate.

13. A production line as set forth in claim 1, wherein the means for washing the block molds is a chamber designed to accommodate a block mold to be washed and provided on the sides with manifolds having nozzles for washing the block mold housing and lids, and manifolds having nozzles mounted for vertical movement for washing molds of the block mold.

14. A production line as set forth in claim 1, including means for closing the lower lid of the block mold comprising grips arranged symmetrically on the sides of the step-type conveyor loosely fitted on a single axle coupled to a hydraulic cylinder rod mounted on the step-type conveyor, and cams secured on the step-type conveyor, said cams having their center of gravity below their rotational axis and cooperating with the lower lid during the course of the conveyor movement.

* * * * *